(12) United States Patent
Takeda et al.

(10) Patent No.: US 12,371,599 B2
(45) Date of Patent: *Jul. 29, 2025

(54) COATING COMPOSITION FOR ELECTRICAL STEEL SHEET, ADHESIVE SURFACE-COATED ELECTRICAL STEEL SHEET AND LAMINATED CORE

(71) Applicant: NIPPON STEEL CORPORATION, Tokyo (JP)

(72) Inventors: Kazutoshi Takeda, Tokyo (JP); Shinsuke Takatani, Tokyo (JP); Minako Fukuchi, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 18/010,548

(22) PCT Filed: Jun. 17, 2021

(86) PCT No.: PCT/JP2021/023022
§ 371 (c)(1),
(2) Date: Dec. 15, 2022

(87) PCT Pub. No.: WO2021/256529
PCT Pub. Date: Dec. 23, 2021

(65) Prior Publication Data
US 2023/0250323 A1    Aug. 10, 2023

(30) Foreign Application Priority Data

Jun. 17, 2020   (JP) ................................ 2020-104233

(51) Int. Cl.
*C09J 163/00*   (2006.01)
*B32B 7/12*   (2006.01)
(Continued)

(52) U.S. Cl.
CPC ............... *C09J 163/00* (2013.01); *B32B 7/12* (2013.01); *B32B 15/011* (2013.01);
(Continued)

(58) Field of Classification Search
CPC ............... B32B 15/011; B32B 2255/06; B32B 2255/26; B32B 2307/208;
(Continued)

(56) References Cited

U.S. PATENT DOCUMENTS

| 3,966,837 A | 6/1976 | Riew et al. |
| 5,049,596 A | 9/1991 | Fujimoto et al. |

(Continued)

FOREIGN PATENT DOCUMENTS

| CN | 1383446 A | 12/2002 |
| CN | 103975506 A | 8/2014 |

(Continued)

*Primary Examiner* — Lawrence D Ferguson
(74) *Attorney, Agent, or Firm* — Birch, Stewart, Kolasch & Birch, LLP

(57) ABSTRACT

This coating composition for an electrical steel sheet contains an epoxy resin, a phenolic curing agent (A) and one or more amine-based curing agents (B) selected from the group consisting of an aromatic amine and dicyandiamide, the amount of the phenolic curing agent (A) is 1 to 40 parts by mass with respect to 100 parts by mass of the epoxy resin, and the amount of the amine-based curing agents (B) is 0.5 to 5 parts by mass with respect to 100 parts by mass of the epoxy resin.

6 Claims, 5 Drawing Sheets

(51) Int. Cl.
    *B32B 15/01*     (2006.01)
    *C08G 59/24*     (2006.01)
    *C08G 59/50*     (2006.01)
    *C08G 59/56*     (2006.01)
    *C08G 59/62*     (2006.01)
    *C09J 5/00*     (2006.01)
    *C09J 11/06*     (2006.01)
    *H01F 1/18*     (2006.01)

(52) U.S. Cl.
    CPC ....... *C08G 59/245* (2013.01); *C08G 59/5006* (2013.01); *C08G 59/5033* (2013.01); *C08G 59/56* (2013.01); *C08G 59/621* (2013.01); *C09J 5/00* (2013.01); *C09J 11/06* (2013.01); *H01F 1/18* (2013.01); *B32B 2255/06* (2013.01); *B32B 2255/26* (2013.01); *B32B 2307/208* (2013.01); *B32B 2307/748* (2013.01); *C09J 2400/166* (2013.01); *C09J 2463/00* (2013.01)

(58) Field of Classification Search
    CPC ................ B32B 2307/748; B32B 7/12; C08G 59/245; C08G 59/4021; C08G 59/5006; C08G 59/5033; C08G 59/56; C08G 59/621; C09D 163/00; C09D 5/00; C09J 11/06; C09J 163/00; C09J 2400/166; C09J 2463/00; C09J 5/00; C21D 8/12; C22C 38/02; C22C 38/04; C22C 38/06; H01F 1/18; H01F 3/02; H01F 41/005
See application file for complete search history.

(56) References Cited

U.S. PATENT DOCUMENTS

| | | | |
|---|---|---|---|
| 5,248,400 A | 9/1993 | Franks et al. | |
| 5,264,503 A | 11/1993 | Marx | |
| 2007/0087201 A1* | 4/2007 | Wimmer .............. | C08G 59/621 525/481 |
| 2014/0327329 A1 | 11/2014 | Kitada | |
| 2016/0375658 A1 | 12/2016 | Kim et al. | |
| 2017/0117758 A1 | 4/2017 | Nakagawa et al. | |
| 2018/0122573 A1 | 5/2018 | Fluch et al. | |
| 2018/0350492 A1 | 12/2018 | Nishimizu et al. | |
| 2019/0097503 A1 | 3/2019 | Ushida et al. | |
| 2019/0160786 A1 | 5/2019 | Nakagawa et al. | |
| 2019/0225758 A1 | 7/2019 | Hirota et al. | |
| 2019/0367746 A1 | 12/2019 | Takeda et al. | |
| 2020/0102454 A1 | 4/2020 | Kang et al. | |

FOREIGN PATENT DOCUMENTS

| | | |
|---|---|---|
| EP | 0232021 A2 | 8/1987 |
| EP | 3 770 226 A1 | 1/2021 |
| EP | 3 902 106 A1 | 10/2021 |
| JP | S52-37934 A | 3/1977 |
| JP | 54-164456 U | 11/1979 |
| JP | 11-162723 A | 6/1999 |
| JP | 11-162724 A | 6/1999 |
| JP | 11-193475 A | 7/1999 |
| JP | 2000-173816 A | 6/2000 |
| JP | 2000-336487 A | 12/2000 |
| JP | 2006-96928 A | 4/2006 |
| JP | 2006-351409 A | 12/2006 |
| JP | 2008-518087 A | 5/2008 |
| JP | 4143090 B2 | 9/2008 |
| JP | 2014-96429 A | 5/2014 |
| JP | 2016-540901 A | 12/2016 |
| JP | 2017-11863 A | 1/2017 |
| JP | 2018-518591 A | 7/2018 |
| JP | 2020-70393 A | 5/2020 |
| KR | 10-2017-0021861 A | 2/2017 |
| KR | 10-2019-0022846 A | 3/2019 |
| KR | 10-2019-0097246 A | 8/2019 |
| TW | 201932303 A | 8/2019 |
| WO | WO 2004/070080 A1 | 8/2004 |
| WO | WO 2006/049935 A1 | 5/2006 |
| WO | WO 2010/146821 A1 | 12/2010 |
| WO | WO 2017/085797 A1 | 5/2017 |
| WO | WO 2019/184981 A1 | 10/2019 |

* cited by examiner

COATING COMPOSITION FOR ELECTRICAL STEEL SHEET, ADHESIVE SURFACE-COATED ELECTRICAL STEEL SHEET AND LAMINATED CORE

TECHNICAL FIELD

The present invention relates to a coating composition for an electrical steel sheet, an adhesive surface-coated electrical steel sheet and a laminated core. Priority is claimed on Japanese Patent Application No. 2020-104233, filed Jun. 17, 2020, the content of which is incorporated herein by reference.

BACKGROUND ART

Ordinarily, in the case of assembling a laminated core such as a motor or a transformer using electrical steel sheets, unit iron cores are produced by shearing or blanking, and then the unit iron cores are laminated and firmly fixed by bolting, swaging, welding or adhesion, thereby obtaining a laminated core. In a firm fixing method such as swaging or welding, mechanical strain or thermal strain is imparted to the laminated core, and thus there are cases where the core iron loss deteriorates.

Regarding such a problem, for example, Patent Documents 1 to 3 have proposed adhesion methods in which an insulating coating exhibiting an adhesive capability by either or both of heating and pressurization (a coating composition for an electrical steel sheet) is used.

CITATION LIST

Patent Document

[Patent Document 1]
  Japanese Unexamined Patent Application, First Publication No. 2000-173816
[Patent Document 2]
  PTC International Publication No. WO 2004/070080
[Patent Document 3]
  Japanese Unexamined Patent Application, First Publication No. 2017-11863

SUMMARY OF THE INVENTION

Problems to be Solved by the Invention

Laminated cores in which unit iron cores are caused to adhere together with the insulating coatings are not imparted with mechanical strain or thermal strain and are thus excellent in terms of core iron loss. However, in recent years, there has been a request for additional improvement in motor efficiency, and additional reduction in core iron loss has been required.

A decrease in the thickness of an electrical steel sheet has been effective for reducing core iron loss. However, since a decrease in the sheet thickness is accompanied by a decrease in the Young's modulus of the electrical steel sheet, it is necessary to prevent stress strain, which is a cause of deterioration of core iron loss, from being imparted to the electrical steel sheet.

Furthermore, in uses such as electrical vehicle motors, high heat resistance is required, but insulating coatings that impart no stress strain to electrical steel sheets are ordinarily soft and have poor heat resistance.

The present invention has been made in consideration of the above-described circumstances, and an objective of the present invention is to provide a coating composition for an electrical steel sheet, an adhesive surface-coated electrical steel sheet and a laminated core that are capable of further suppressing stress strain that is imparted to electrical steel sheets and have heat resistance high enough to maintain the adhesion strength even during the generation of heat from motors.

Means for Solving the Problem

In order to solve the above-described problems, the present invention proposes the following means.

[1] A coating composition for an electrical steel sheet according to an aspect of the present invention contains an epoxy resin, a phenolic curing agent (A) and one or more amine-based curing agents (B) selected from an aromatic amine and dicyandiamide, in which the amount of the phenolic curing agent (A) is 1 to 40 parts by mass with respect to 100 parts by mass of the epoxy resin, and the amount of the amine-based curing agents (B) is 0.5 to 5 parts by mass with respect to 100 parts by mass of the epoxy resin.

[2] The coating composition for an electrical steel sheet according to [1], in which a mass ratio represented by [the amount of the phenolic curing agent (A)]/[the amount of the amine-based curing agents (B)] may be 1 to 20.

[3] An adhesive surface-coated electrical steel sheet according to an aspect of the present invention has an insulating coating containing the coating composition for an electrical steel sheet according to [1] or [2] on a surface, in which the thickness is 0.65 mm or less.

[4] A laminated core according to an aspect of the present invention is formed by laminating two or more adhesive surface-coated electrical steel sheets according to [3].

Effects of the Invention

According to the above-described aspects of the present invention, it is possible to provide a coating composition for an electrical steel sheet, an adhesive surface-coated electrical steel sheet and a laminated core that are capable of further suppressing stress strain that is imparted to electrical steel sheets and have heat resistance high enough to maintain the adhesion strength even during the generation of heat from motors.

EMBODIMENT FOR IMPLEMENTING THE INVENTION

Hereinafter, a laminated core (laminated core) according to an embodiment of the present invention, a rotary electric machine including this laminated core and a material that forms this laminated core will be described. In the present embodiment, as the rotary electric machine, an electric motor, specifically, an alternating-current electric motor, more specifically, a synchronous electric motor, and, still more specifically, a permanent magnet field-type electric motor will be described as an example. This type of electric motor is preferably employed in, for example, electric vehicles.

In addition, numerical limiting ranges expressed below using "to" include the lower limit value and the upper limit value in the ranges. Numerical values expressed with "less than" or "more than" are not included in numerical ranges.

Figure 1:
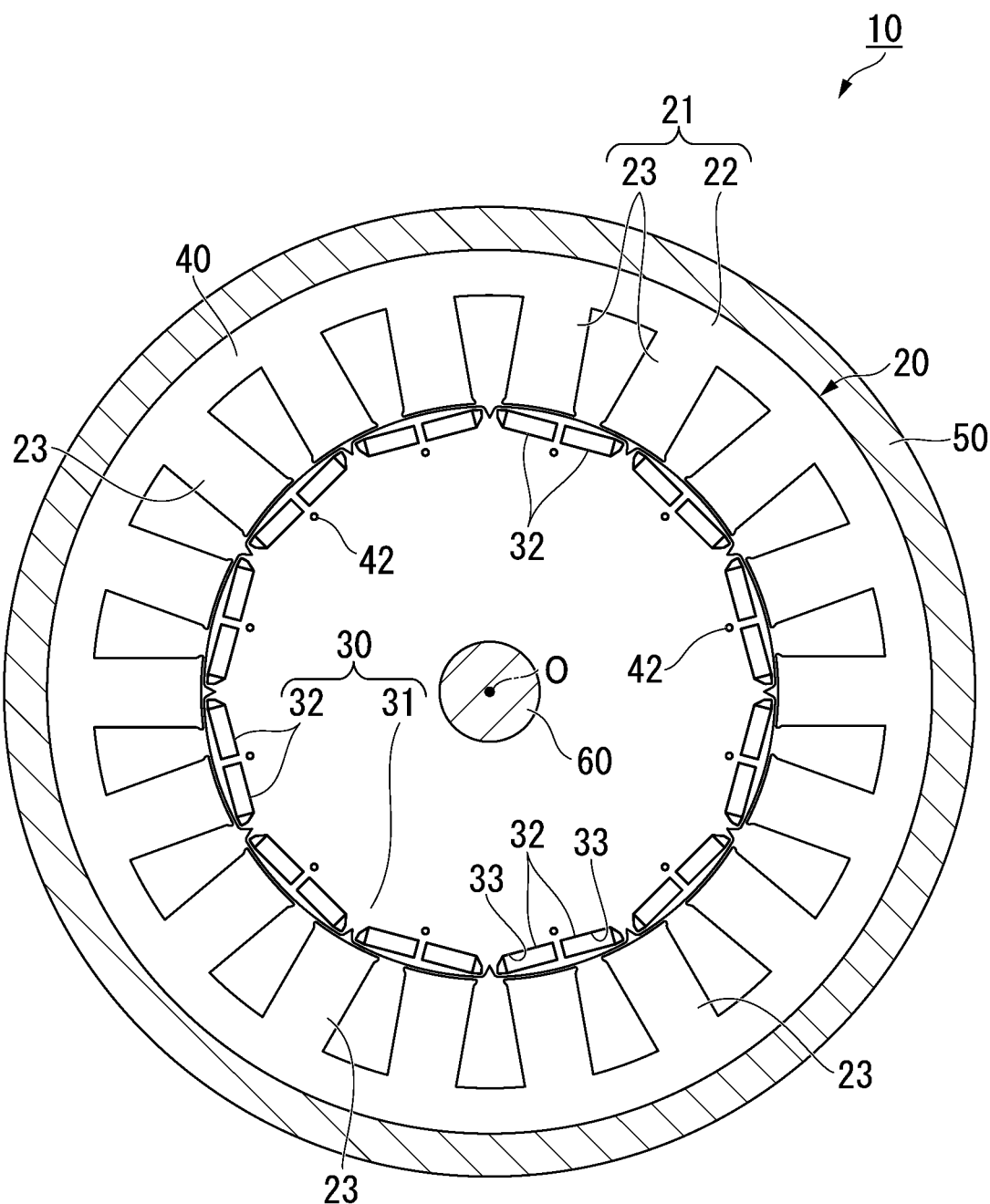
FIG. 1 is a cross-sectional view of a rotary electric machine including a laminated core according to an embodiment of the present invention.

As shown in FIG. 1, a rotary electric machine 10 includes a stator 20, a rotor 30, a case 50 and a rotary shaft 60. The stator 20 and rotor 30 are accommodated in the case 50. The stator 20 is fixed in the case 50.

In the present embodiment, as the rotary electric machine 10, an inner rotor type in which the rotor 30 is positioned radially inside the stator 20 is employed. However, as the rotary electric machine 10, an outer rotor type in which the rotor 30 is positioned outside the stator 20 may also be employed. In addition, in the present embodiment, the rotary electric machine 10 is a three-phase alternating-current motor having 12 poles and 18 slots. However, the number of poles, the number of slots, the number of phases, and the like can be changed as appropriate.

The rotary electric machine 10 can be rotated at a rotation speed of 1000 rpm by, for example, applying an excitation current of an effective value of 10 A and a frequency of 100 Hz to each phase.

The stator 20 includes an adhesive laminated core for the stator (hereinafter, stator core) 21 and a winding, not shown.

The stator core 21 includes a ring-shaped core back portion 22 and a plurality of tooth portions 23. Hereinafter, a direction along the central axis O of the stator core 21 (or the core back portion 22) will be referred to as the axial direction, the radial direction of the stator core 21 (or the core back portion 22) (a direction orthogonal to the central axis O) will be referred to as the radial direction, and the circumferential direction (a direction around the central axis O) of the stator core 21 (or the core back portion 22) will be referred to as the circumferential direction.

The core back portion 22 is formed in an annular shape in a plan view of the stator 20 seen in the axial direction.

The plurality of tooth portions 23 protrude radially inward (toward the central axis O of the core back portion 22 along the radial direction) from the inner circumference of the core back portion 22. The plurality of tooth portions 23 are disposed at equal angular intervals in the circumferential direction. In the present embodiment, 18 tooth portions 23 are provided every center angle of 20 degrees around the central axis O. The plurality of tooth portions 23 are formed in mutually equivalent shapes and mutually equivalent sizes. This makes the plurality of tooth portions 23 have mutually the same thickness dimensions.

The winding is wound around the tooth portions 23. The winding may be a concentrated winding or a distributed winding.

The rotor 30 is disposed radially inside the stator 20 (stator core 21). The rotor 30 includes a rotor core 31 and a plurality of permanent magnets 32.

The rotor core 31 is formed in a ring shape (annular shape) that is concentrically disposed with respect to the stator 20. The rotary shaft 60 is disposed in the rotor core 31. The rotary shaft 60 is fixed to the rotor core 31.

The plurality of permanent magnets 32 are fixed to the rotor core 31. In the present embodiment, one set of two permanent magnets 32 forms one magnetic pole. The plurality of permanent magnets 32 are disposed at equal angular intervals in the circumferential direction. In the present embodiment, 12 sets of permanent magnets 32 (24 permanent magnets in total) are provided every center angle of 30 degrees around the central axis O.

Figure 2:
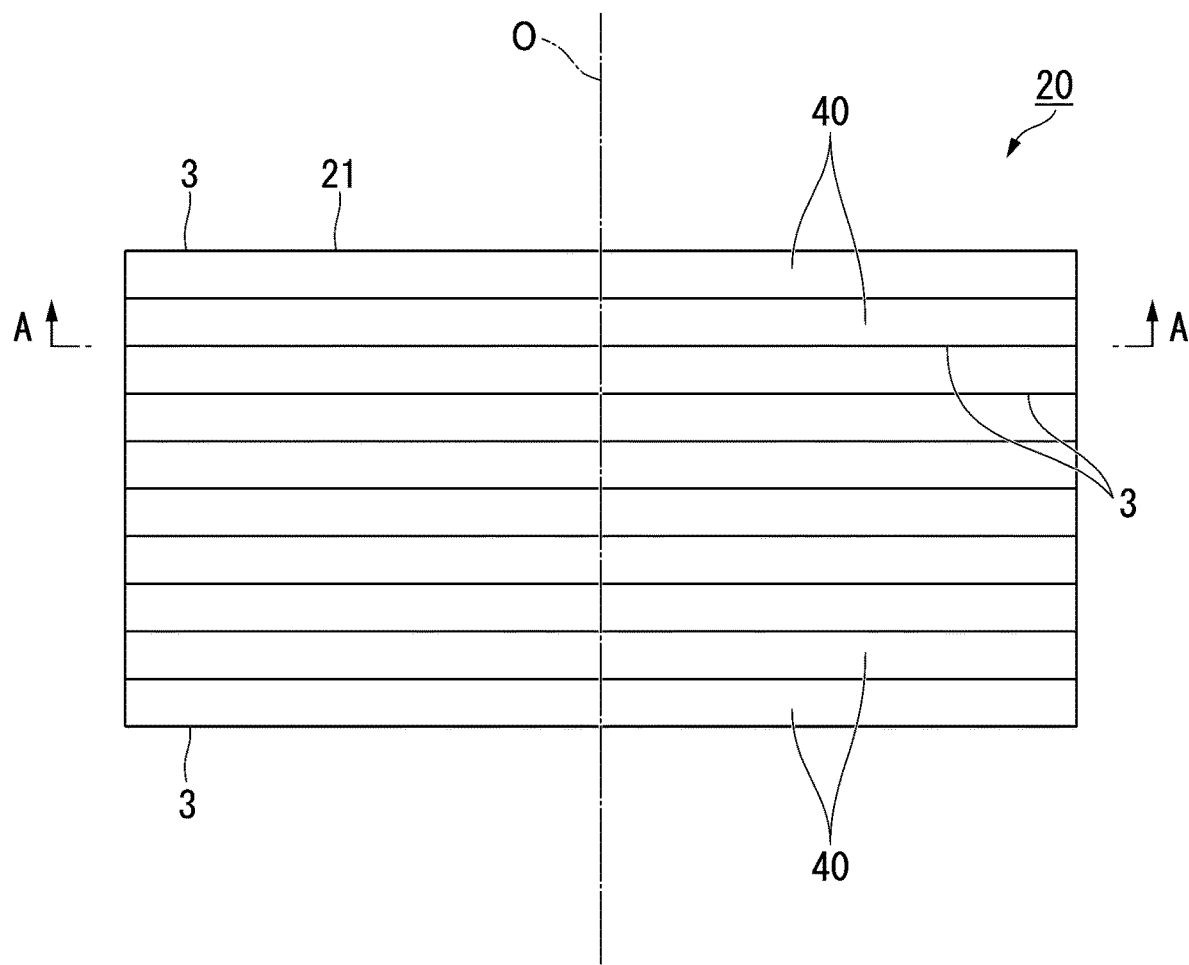
FIG. 2 is a side view of the laminated core shown in FIG. 1.

In the present embodiment, as the permanent magnet field-type electric motor, an embedded magnet-type motor is employed. In the rotor core 31, a plurality of through holes 33 penetrating the rotor core 31 in the axial direction are formed. The plurality of through holes 33 are provided so as to correspond to the disposition of the plurality of permanent magnets 32. Each permanent magnet 32 is fixed to the rotor core 31 in a state of being disposed in the corresponding through hole 33. Each permanent magnet 32 can be fixed to the rotor core 31 by, for example, causing the outer surface of the permanent magnet 32 and the inner surface of the through hole 33 to adhere to each other with an adhesive. As the permanent magnet field-type electric motor, a surface permanent magnet-type motor may be employed instead of the embedded magnet-type motor The stator core 21 and the rotor core 31 are both laminated cores. For example, the stator core 21 is formed by laminating a plurality of electrical steel sheets (adhesive surface-coated electrical steel sheets) 40 in the lamination direction as shown in FIG. 2.

The lamination thickness (total length along the central axis O) of each of the stator core 21 and the rotor core 31 is set to, for example, 50.0 mm. The outer diameter of the stator core 21 is set to, for example, 250.0 mm. The inner diameter of the stator core 21 is set to, for example, 165.0 mm. The outer diameter of the rotor core 31 is set to, for example, 163.0 mm. The inner diameter of the rotor core 31 is set to, for example, 30.0 mm. These values are simply examples, and the lamination thickness, outer diameter and inner diameter of the stator core 21 and the lamination thickness, outer diameter and inner diameter of the rotor core 31 are not limited to these values. Here, the inner diameter of the stator core 21 is based on the tip portions of the tooth portions 23 in the stator core 21. That is, the inner diameter of the stator core 21 is the diameter of a virtual circle that inscribes the tip portions of all of the tooth portions 23.

Figure 4:
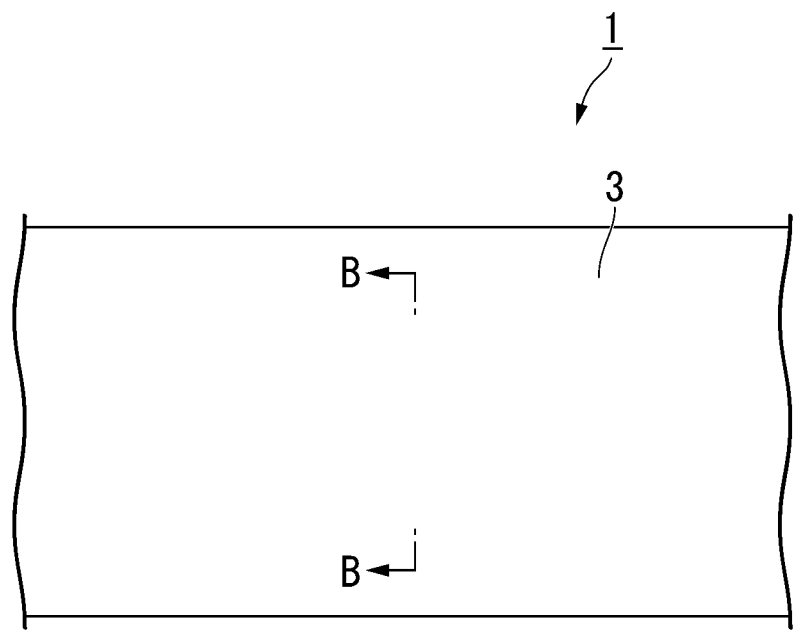
FIG. 4 is a plan view of a material for forming the laminated core shown in FIG. 1.
Figure 5:
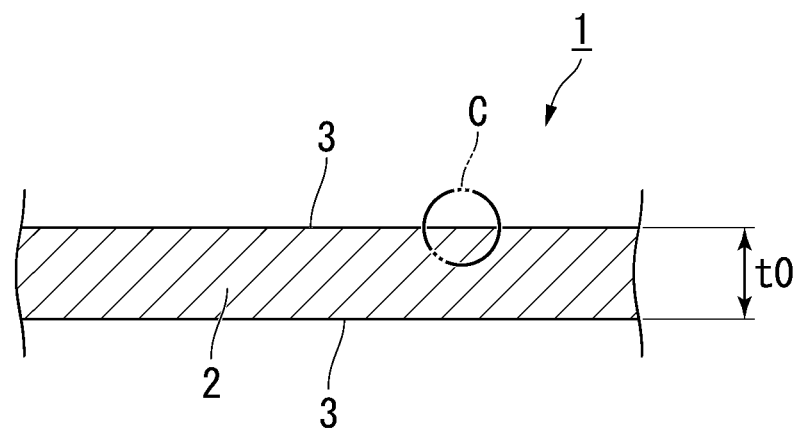
FIG. 5 is a cross-sectional view in a direction of a line B-B in FIG. 4.
Figure 6:
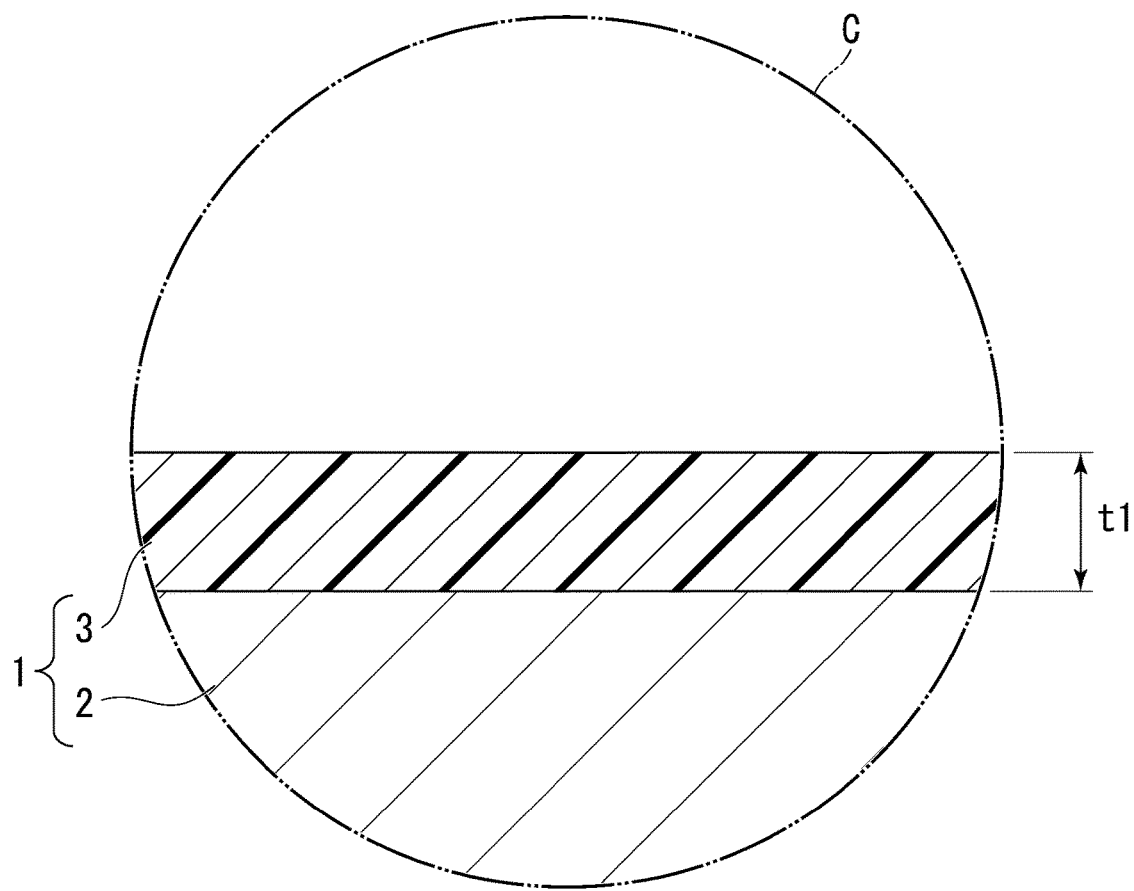
FIG. 6 is an enlarged view of a C part of FIG. 5.

Each of the electrical steel sheets 40 that form the stator core 21 and the rotor core 31 is formed by, for example, blanking a material 1 as shown in FIG. 4 to FIG. 6 or the like. The material 1 is a steel sheet (electrical steel sheet) that serves as the base material of the electrical steel sheet 40. Examples of the material 1 include a strip-shaped steel sheet (electrical steel strip), a cut-to-length sheet and the like.

While the topic of the current description is the laminated core, this material 1 will be described below. In the present specification, there is a case where a strip-shaped steel sheet that serves as the base material of the electrical steel sheet 40 is referred to as the material 1. There is a case where a steel sheet formed into a shape that is used in the laminated core by blanking the material 1 is referred to as the electrical steel sheet 40.

The material 1 is handled in a state of, for example, being wound around a coil 1A. In the present embodiment, a non-oriented electrical steel sheet is employed as the material 1. As the non-oriented electrical steel sheet, a non-oriented electrical steel strip of JIS C 2552: 2014 can be employed. However, instead of the non-oriented electrical steel sheet, an oriented electrical steel sheet may be employed as the material 1. As the oriented electrical steel sheet in this case, an oriented electrical steel strip of JIS C 2553: 2019 can be employed. In addition, a non-oriented thin electrical steel strip or oriented thin electrical steel strip of JIS C 2558: 2015 can be employed.

The upper and lower limit values of the average sheet thickness t0 of the material 1 are set, for example, as described below in consideration of a case where the material 1 is used as the electrical steel sheet 40.

As the material 1 becomes thinner, the manufacturing cost of the material 1 increases. Therefore, when the manufacturing cost is taken into account, the lower limit value of the average sheet thickness t0 of the material 1 becomes 0.10 mm, preferably becomes 0.15 mm and more preferably becomes 0.18 mm.

On the other hand, when the material 1 is too thick, the manufacturing cost becomes favorable; however, in a case where the material 1 has been used as the electrical steel sheet 40, the eddy-current loss increases, and the core iron loss deteriorates. Therefore, when the core iron loss and the manufacturing cost are taken into account, the upper limit value of the average sheet thickness t0 of the material 1 becomes 0.65 mm, preferably becomes 0.35 mm and more preferably becomes 0.30 mm.

As the thickness that satisfies the above-described range of the average sheet thickness t0 of the material 1, 0.20 mm can be an example.

The average sheet thickness t0 of the material 1 includes not only the thickness of a base material steel sheet 2 to be described below but also the thickness of an insulating coating 3. In addition, as a method for measuring the average sheet thickness t0 of the material 1, for example, the following measurement method is followed. For example, in a case where the material 1 is wound in the shape of the coil 1A, at least a part of the material 1 is unwound in a flat sheet shape. In the material 1 unwound in a flat sheet shape, a predetermined position in the longitudinal direction of the material 1 (for example, a position apart from one end edge of the material 1 in the longitudinal direction by 10% of the total length of the material 1) is selected. At this selected position, the material 1 is divided into five regions along the width direction. At four sites that become the boundaries of these five regions, the sheet thickness of the material 1 is measured. The average value of the sheet thicknesses at the four sites can be defined as the average sheet thickness t0 of the material 1.

It is needless to say that the upper and lower limit values of the average sheet thickness t0 of this material 1 can also be employed as the upper and lower limit values of the average sheet thickness t0 of the electrical steel sheet 40. As a method for measuring the average sheet thickness t0 of the electrical steel sheet 40, for example, the following measurement method is followed. For example, the lamination thickness of the laminated core is measured at four sites at equal intervals in the circumferential direction (that is, every 90 degrees around the central axis O). Each of the measured lamination thicknesses at the four sites is divided by the number of the electrical steel sheets 40 laminated, thereby calculating the sheet thickness per sheet. The average value of the sheet thicknesses at the four sites can be defined as the average sheet thickness t0 of the electrical steel sheet 40.

As shown in FIG. 5 and FIG. 6, the material 1 includes the base material steel sheet 2 and the insulating coatings 3. The material 1 is formed by coating both surfaces of the strip-shaped base material steel sheet 2 with the insulating coatings 3. In the present embodiment, the majority of the material 1 is formed of the base material steel sheet 2, and the insulating coatings 3 that are each thinner than the base material steel sheet 2 are laminated on the surfaces of the base material steel sheet 2.

The chemical composition of the base material steel sheet 2 contains, by mass %, 2.5% to 4.5% of Si as described below. When the chemical composition is in this range, it is possible to set the yield strength of the material 1 (electrical steel sheet 40) to, for example, 380 MPa or more and 540 MPa or less.

Si: 2.5% to 4.5%
Al: 0.001% to 3.0%
Mn: 0.05% to 5.0%
Remainder: Fe and impurities When the material 1 is used as the electrical steel sheet 40, the insulating coating 3 exhibits insulating performance between the electrical steel sheets 40 adjacent to each other in the lamination direction. In addition, in the present embodiment, the insulating coating 3 has an adhesive capability and causes the electrical steel sheets 40 adjacent to each other in the lamination direction to adhere to each other. The insulating coating 3 may be configured as a single layer or a plurality of layers. More specifically, for example, the insulating coating 3 may be configured as a single layer having both insulating performance and an adhesive capability or may be configured as a plurality of layers including an underlying insulating coating having excellent insulating performance and an overlying insulating coating having excellent adhesion performance. "The adhesive capability of the insulating coating 3" in the present embodiment means a capability of developing an adhesion strength of a predetermined value or higher under a predetermined temperature condition in a laminate composed of a plurality of the electrical steel sheets 40 laminated with the insulating coating 3 interposed therebetween.

In the present embodiment, the insulating coatings 3 fully cover both surfaces of the base material steel sheet 2 with no gap. However, some of the insulating coatings 3 may cover both surfaces of the base material steel sheet 2 with a gap as long as the above-described insulating performance or adhesive capability is ensured. In other words, some of the insulating coatings 3 may be intermittently provided on the surface of the base material steel sheet 2. However, in order to ensure the insulating performance, there is a need for both surfaces of the base material steel sheet 2 to be covered with the insulating coatings 3 so as to prevent both surfaces of the base material steel sheet 2 from being fully exposed. Specifically, in a case where the insulating coating 3 has no underlying insulating coating having excellent insulating performance and is configured as a single layer having both insulating performance and an adhesive capability, the insulating coating 3 needs to be formed on the entire surface of the base material steel sheet 2 with no gap. In contrast, in a case where the insulating coating 3 is configured as a plurality of layers including an underlying insulating coating having excellent insulating performance and an overlying insulating coating having an excellent adhesive capability, not only when both the underlying insulating coating and the overlying insulating coating are formed on the entire surface of the base material steel sheet 2 with no gap, but also when the underlying insulating coating is formed on the entire surface of the base material steel sheet with no gap, but the overlying insulating coating is intermittently provided, both the insulating performance and the adhesive capability are satisfied.

A coating composition that configures the underlying insulating coating is not particularly limited, and, for example, an ordinary treatment agent such as a chromic acid-containing treatment agent or a phosphoric acid-containing treatment agent can be used.

The insulating coating having an adhesive capability is formed by applying a coating composition for an electrical steel sheet to be described below onto the base material steel sheet. The insulating coating having an adhesive capability is, for example, an insulating coating configured as a single layer having insulating performance and an adhesive capability or an overlying insulating coating that is provided on an underlying insulating coating. The insulating coating having an adhesive capability is in an uncured state or semi-cured state (B stage) before bonded by heat and pressure during the manufacturing of the laminated core and develops the adhesive capability by heating during bonding by heat and pressure, which makes a curing reaction proceed.

The insulating coating 3 contains a coating composition for an electrical steel sheet of the present embodiment. The coating composition for an electrical steel sheet contains an epoxy resin and an epoxy resin curing agent.

The epoxy resin can be used with no particular limitations as long as the epoxy resin has two or more epoxy groups in one molecule. Examples of such an epoxy resin include a bisphenol A-type epoxy resin, a bisphenol F-type epoxy resin, a triphenylmethane-type epoxy resin, a phenol novolac-type epoxy resin, a cresol novolac-type epoxy resin, an alicyclic epoxy resin, a glycidyl ester-type epoxy resin, a glycidylamine-type epoxy resin, a hydantoin-type epoxy resin, an isocyanurate-type epoxy resin, an acrylic acid-modified epoxy resin (epoxy acrylate), a phosphorus-containing epoxy resin, halides or hydrogenated substances thereof (a brominated epoxy resin and the like) and the like. These epoxy resins may be used singly or two or more epoxy resins may be used in combination.

The amount of the epoxy resin is, for example, preferably 30 to 90 mass %, more preferably 40 to 80 mass % and still more preferably 50 to 70 mass % of the total mass of the coating composition for an electrical steel sheet. When the amount of the epoxy resin is the above-described lower limit value or more, the adhesion strength of the electrical steel sheet 40 can be further increased. When the amount of the epoxy resin is the above-described upper limit value or less, stress strain in the electrical steel sheet 40 can be further suppressed.

Epoxy resin curing agents can be classified into a room temperature (1° C. to 30° C.) curing type, a heating curing type and others (photocuring type and the like).

As an epoxy resin curing agent for an adhesive coating (insulating coating), a heating curing-type epoxy resin curing agent can be used. Examples of the heating curing-type epoxy resin curing agent include an aromatic anine, a phenolic curing agent, an acid anhydride-based curing agent, dicyandiamide and the like.

The epoxy resin curing agent of the present embodiment contains a phenolic curing agent (A) and an amine-based curing agent (B).

Examples of the phenolic curing agent (A) include a phenolic novolac resin, a cresol novolac resin, a bisphenol novolac resin, a triazine-modified phenolic novolac resin, a phenolic resol resin, a cresol naphthol formaldehyde condensate and the like.

The phenolic curing agents (A) may be used singly or two or more phenolic curing agents (A) may be used in combination.

The amount of the phenolic curing agent (A) is 1 to 40 parts by mass with respect to 100 parts by mass of the epoxy resin. The lower limit value of the amount of the phenolic curing agent (A) is preferably 5 parts by mass or more, more preferably 10 parts by mass or more and still more preferably more than 15 parts by mass. In addition, the upper limit value of the amount of the phenolic curing agent (A) is preferably 35 parts by mass or less and more preferably 30 parts by mass or less. When the amount of the phenolic curing agent (A) is the above-described lower limit value or more, the heat resistance of the coating composition for an electrical steel sheet can be further enhanced. When the amount of the phenolic curing agent (A) is the above-described upper limit value or less, stress strain that is imparted to the electrical steel sheet 40 can be further suppressed.

The amine-based curing agent (B) is one or more selected from the group consisting of an aromatic amine and dicyandiamide. In the present embodiment, when the amine-based curing agent (B) is used as the epoxy resin curing agent, it is possible to further suppress stress strain that is imparted to the electrical steel sheet 40, and consequently, it is possible to significantly improve the magnetic characteristics of the electrical steel sheet 40. From such a viewpoint, as the amine-based curing agent (B), at least an aromatic amine is preferably used.

Examples of the aromatic amine include meta-xylylenediamine, meta-phenylenediamine, diaminodiphenylmethane, diaminodiphenyl sulfone and the like.

Dicyandiamide is also known as a latent curing agent. The latent curing agent can be stably stored at room temperature by being blended with the epoxy resin and has a capability of rapidly curing resin compositions with heat, light, pressure or the like.

In the case of applying dicyandiamide, it is preferable to jointly use dicyandiamide with a curing accelerator. Examples of the curing accelerator include tertiary amines, imidazoles, aromatic amines and the like.

The amine-based curing agents (B) may be used singly or two or more amine-based curing agents (B) may be used in combination.

The amount of the amine-based curing agent (B) is 0.5 to 5.0 parts by mass with respect to 100 parts by mass of the epoxy resin. The lower limit value of the amount of the amine-based curing agent (B) is preferably 1.0 part by mass or more, more preferably 2.0 parts by mass or more and still more preferably 2.5 parts by mass or more. In addition, the upper limit value of the amount of the amine-based curing agent (B) is preferably 4.5 parts by mass or less and more preferably 4.0 parts by mass or less. When the amount of the amine-based curing agent (B) is the above-described lower limit value or more, stress strain that is imparted to the electrical steel sheet 40 can be further suppressed. When the amount of the amine-based curing agent (B) is the above-described upper limit value or less, the adhesion strength of the electrical steel sheet 40 can be further increased.

The mass ratio represented by [the amount of the phenolic curing agent (A)]/[the amount of the amine-based curing agent (B)] (hereinafter, also referred to as "A/B ratio") is preferably 1.0 to 20.0. The A/B ratio is more preferably 5.0 or more, still more preferably more than 10.0 and far still more preferably more than 15.0. When the A/B ratio is within the above-described numerical range, both the suppression of stress strain and heat resistance can be more favorably satisfied.

The epoxy resin curing agent of the present embodiment may contain a different epoxy resin curing agent (D) other than the phenolic curing agent (A) and the amine-based curing agents (B).

Examples of the different epoxy resin curing agent (D) include an acid anhydride-based curing agent, an aliphatic polyamine, a modified amine, polyamidoamine, a secondary amine, a tertiary amine, imidazoles, polymercaptans, a hydrazide compound and the like.

These different epoxy resin curing agents (D) may be used singly or two or more epoxy resin curing agents (D) may be used in combination.

Examples of the acid anhydride-based curing agent include phthalic anhydride, hexahydrophthalic anhydride, methyltetrahydrophthalic anhydride, methylhexahydrophthalic anhydride, nadic methyl anhydride, chlorendic anhydride, pyromellitic anhydride, benzophenone tetracarboxylic anhydride, ethylene glycol bis(anhydrotrimellitate), methylcyclohexene tetracarboxylic anhydride, trimellitic anhydride, polyazelaic polyanhydride and the like.

Examples of the aliphatic polyamine include diethylenetriamine, triethylenetetramine, dipropylenediamine, diethylaminopropylamine and the like.

Examples of the polyamidoamine include polyamide resins produced by the condensation of a dicarboxylic acid and an aliphatic polyamine and the like.

Examples of the dicarboxylic acid include succinic acid, adipic acid, pimelic acid, azelaic acid, sebacic acid, dodecanedioic acid, hexahydrophthalic acid and the like.

Examples of the modified amine include a polyamine epoxy resin adduct (amine adduct), ketimine and the like.

Examples of the secondary amine include piperidine and the like.

Examples of the tertiary amine include N,N-dimethylpiperazine, triethylenediamine, benzyldimethylainine, 2-(dimethylaminomethyl)phenol, 2,4,6-tris(dimethylaminomethyl)phenol and the like.

Examples of the imidazoles include 2-methylimidazole, 2-ethyl-4-methylimidazole, trimellitic acid 1-cyanoethyl-2-undecylimidazolium and the like.

Examples of the polymercaptans include a liquid polymercaptan, a polysulfide resin and the like.

Examples of the hydrazide compound include adipic acid dihydrazide, isophthalic acid dihydrazide, sebacic acid dihydrazide, salicylic acid hydrazide and the like.

The amount of the different epoxy resin curing agent is preferably 3 parts by mass or less with respect to 100 parts by mass of the epoxy resin.

The coating composition for an electrical steel sheet of the present embodiment may contain a component other than the epoxy resin and the epoxy resin curing agent (hereinafter, also referred to as "arbitrary component").

Examples of the arbitrary component include a curing accelerator that does not correspond to the above-described epoxy resin curing agent (curing catalyst), an emulsifier, a defoamer, a leveling agent, a viscosity adjuster, a preservative and the like.

Examples of the emulsifier include a nonionic surfactant and the like.

Examples of the defoamer include a silicone-based defoamer and the like.

Examples of the leveling agent include an acrylic polymer-based leveling agent, a silicone-based leveling agent or the like.

Examples of the viscosity adjuster include a clay-based silicate such as bentonite or hectorite and the like.

Examples of the preservative include an isothiazolinone derivative-based preservative and the like.

In a case where the coating composition for an electrical steel sheet of the present embodiment contains the arbitrary component, the amount of the optical component is preferably 0.01 to 5 parts by mass with respect to 100 parts by mass of the epoxy resin.

The coating composition for an electrical steel sheet of the present embodiment is applied to an electrical steel sheet and then dried, thereby obtaining the insulating coating 3. At the time of being applied to the electrical steel sheet, the coating composition for an electrical steel sheet of the present embodiment is preferably baked and applied.

The achieving temperature during the baking is, for example, preferably 120° C. to 220° C., more preferably 130° C. to 210° C. and still more preferably 140° C. to 200° C. When the achieving temperature is the above-described lower limit value or higher, the coating composition for an electrical steel sheet sufficiently adheres to the electrical steel sheet, and peeling is suppressed. When the achieving temperature is the above-described upper limit value or lower, it is possible to suppress the curing of the epoxy resin and to maintain the adhesive capability of the coating composition for an electrical steel sheet.

The baking time during the baking is, for example, preferably 5 to 60 seconds, more preferably 10 to 30 seconds and still more preferably 10 to 20 seconds. When the baking time is the above-described lower limit value or longer, the coating composition for an electrical steel sheet sufficiently adheres to the electrical steel sheet, and peeling is suppressed. When the baking time is the above-described upper limit value or shorter, it is possible to suppress the curing of the epoxy resin and to maintain the adhesive capability of the coating composition for an electrical steel sheet.

The upper and lower limit values of the average thickness $t1$ of the insulating coating 3 may be set, for example, as described below in consideration of a case where the material 1 is used as the electrical steel sheet 40.

In a case where the material 1 is used as the electrical steel sheet 40, the average thickness $t1$ of the insulating coating 3 (the thickness of the electrical steel sheet 40 (material 1) per surface) is adjusted such that insulating performance and an adhesive capability between the electrical steel sheets 40 that are laminated together can be ensured.

In the case of the insulating coating 3 configured as a single layer, the average thickness $t1$ of the insulating coating 3 (the thickness of the electrical steel sheet 40 (material 1) per surface) can be set to, for example, 1.5 μm or more and 8.0 μm or less. In the case of the insulating coating 3 configured as a plurality of layers, the average thickness of the underlying insulating coating can be set to, for example, 0.3 μm or more and 2.5 μm or less and is preferably 0.5 μm or more and 1.5 μm or less. The average thickness of the overlying insulating coating can be set to, for example, 1.5 μm or more and 8.0 μm or less.

As a method for measuring the average thickness $t1$ of the insulating coating 3 in the material 1, with the same concept of the average sheet thickness $t0$ of the material 1, the thicknesses of the insulating coating 3 at a plurality of sites are measured, and the average of these thicknesses can be obtained.

It is needless to say that the upper and lower limit values of average thickness $t1$ of the insulating coating 3 in the material 1 can also be employed as the upper and lower limit values of the average thickness $t1$ of the insulating coating 3 in the electrical steel sheet 40.

As a method for measuring the average thickness $t1$ of the insulating coating 3 in the electrical steel sheet 40, for example, the following measurement method is followed. For example, among the plurality of electrical steel sheets that form the laminated core, the electrical steel sheet 40 that is positioned outermost in the lamination direction (the electrical steel sheet 40 having a surface exposed in the lamination direction) is selected. On the surface of the selected electrical steel sheet 40, a predetermined position in the radial direction (for example, a position exactly in the middle (at the center) between the inner circumferential edge and the outer circumferential edge in the electrical steel sheet 40) is selected. At the selected position, the thickness of the insulating coating 3 of the electrical steel sheet 40 is measured at four sites at equal intervals in the circumferential direction (that is, every 90 degrees around the central axis O). The average value of the measured thicknesses at the four sites can be regarded as the average thickness t1 of the insulating coating 3.

The reason for measuring the average thickness t1 of the insulating coating 3 in the electrical steel sheet 40 that is positioned outermost in the lamination direction as described above is that the insulating coating 3 is carefully produced so that the thickness of the insulating coating 3 rarely changes at the lamination position along the lamination direction of the electrical steel sheet 40.

The electrical steel sheets 40 are manufactured by blanking the materials 1 as described above, and the laminated core (the stator core 21 or the rotor core 31) is manufactured with the electrical steel sheets 40.

Hereinafter, the laminated core will be described again.

Figure 3:
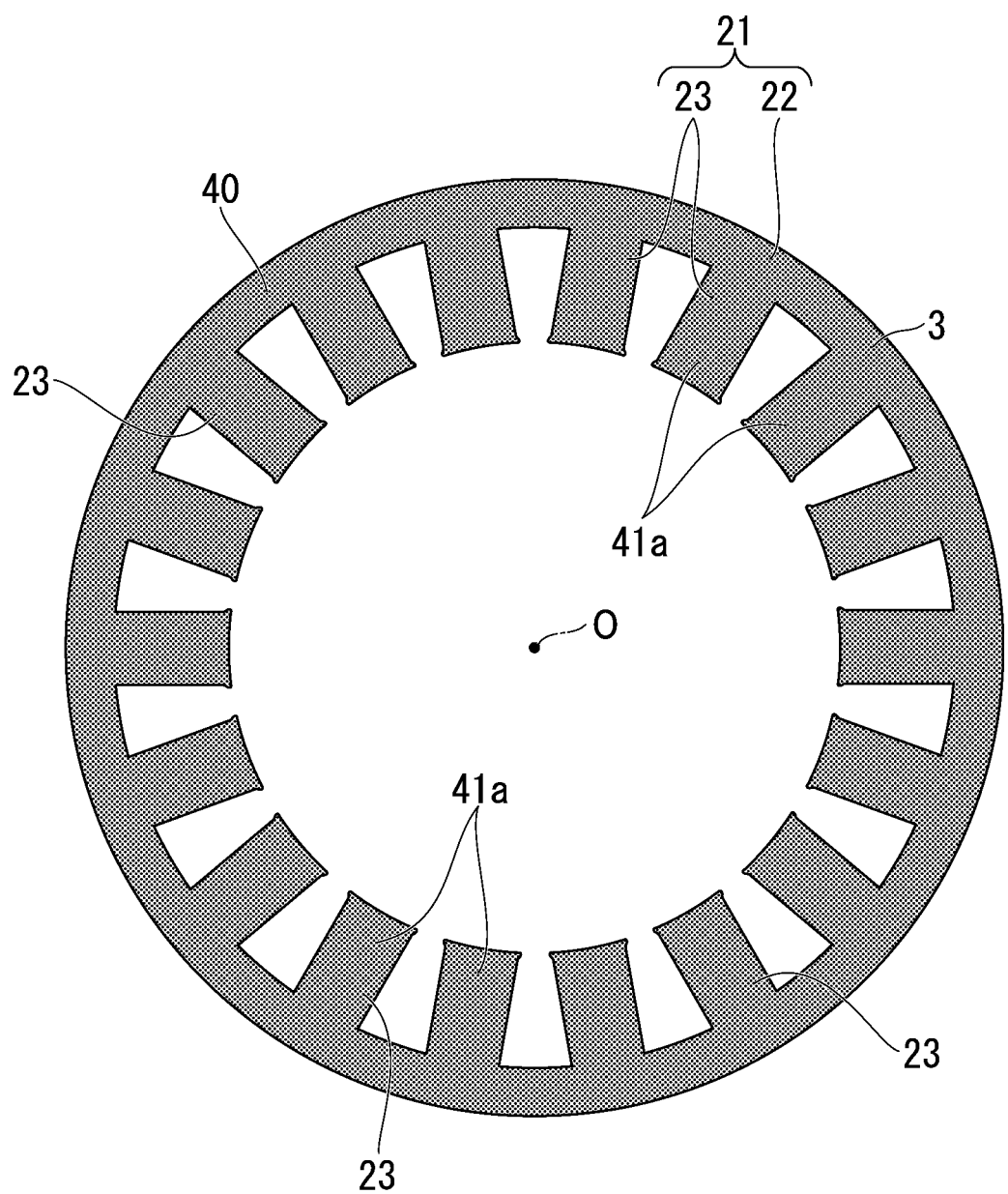
FIG. 3 is a cross-sectional view inn a direction of a line A-A in FIG. 2.

The plurality of electrical steel sheet 40 that form the stator core 21 are laminated with the insulating coating 3 interposed therebetween as shown in FIG. 3.

The electrical steel sheets 40 adjacent to each other in the lamination direction adhere to each other throughout the entire surfaces with the insulating coating 3. In other words, the surface of the electrical steel sheet 40 in the lamination direction (hereinafter, referred to as the first surface) forms an adhesive areas 41a as a whole. Here, the electrical steel sheets 40 adjacent to each other in the lamination direction may not adhere to each other throughout the entire surfaces. In other words, on the first surface of the electrical steel sheet 40, the adhesive area 41a and a non-adhesive area (not shown) may be present in a mixed manner.

In the present embodiment, the plurality of electrical steel sheets 40 that form the rotor core 31 are fixed to each other with swages 42 (dowels) shown in FIG. 1. However, the plurality of electrical steel sheets that form the rotor core 31 also may have a laminated structure in which the electrical steel sheets are fixed with the insulating coatings 3 as in the stator core 21.

In addition, the laminated core such as the stator core 21 or the rotor core 31 may be formed by so-called rotating palletization.

Figure 7:
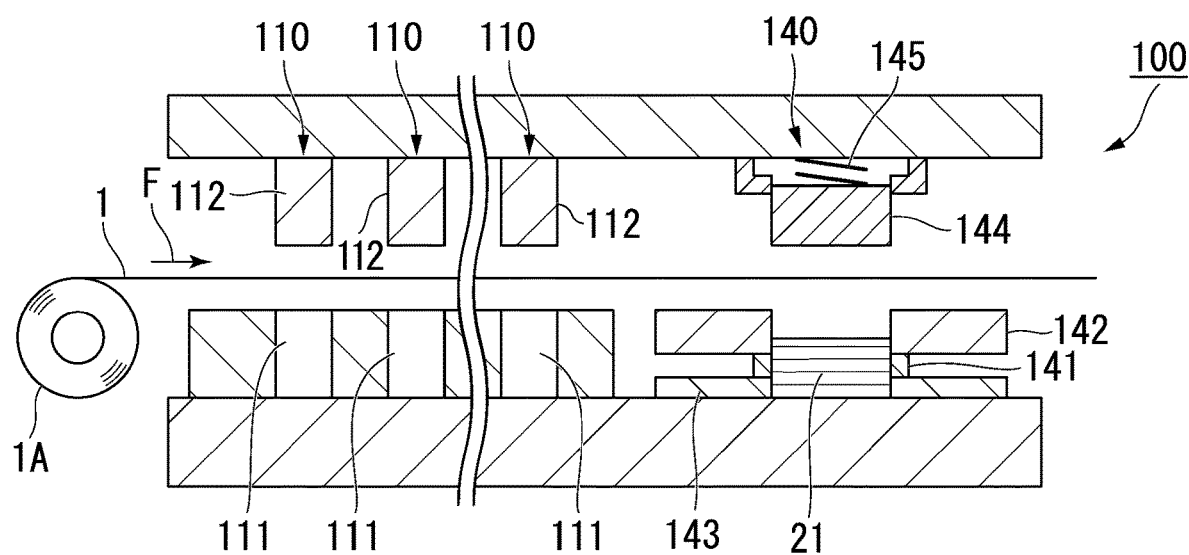
FIG. 7 is a side view of a manufacturing device that is used for manufacturing the laminated core shown in FIG. 1.

The stator core 21 is manufactured using, for example, a manufacturing device 100 shown in FIG. 7. Hereinafter, in the description of a manufacturing method, first, the manufacturing device 100 of the laminated core (hereinafter, simply referred to as the manufacturing device 100) will be described.

In the manufacturing device 100, the material 1 is gradually formed into the shape of the electrical steel sheet 40 by performing blanking a plurality of times with a disposed at each stage while being sent in an arrow F direction from the coil 1A (hoop). In addition, the blanked electrical steel sheets 40 are laminated and pressurized while being heated. As a result, the electrical steel sheets 40 adjacent to each other in the lamination direction are caused to adhere together with the insulating coatings 3 (that is, a part of the insulating coating 3 that is positioned in the adhesive area 41a is made to exhibit an adhesive capability), and the adhesion is completed.

As shown in FIG. 7, the manufacturing device 100 includes a plurality of stages of blanking stations 110. The number of the stages of the blanking stations 110 may be two or more. Each stage of the blanking station 110 includes a female mold 111 disposed below the material 1 and a male mold 112 disposed above the material 1.

The manufacturing device 100 further includes a lamination station 140 at a position downstream of the blanking station 110 provided most downstream. This lamination station 140 includes a heating device 141, an outer circumferential blanking female mold 142, a heat-insulating member 143, an outer circumferential blanking male mold 144 and a spring 145.

The heating device 141, the outer circumferential blanking female mold 142 and the heat-insulating member 143 are disposed below the material 1. On the other hand, the outer circumferential blanking male mold 144 and the spring 145 are disposed above the material 1. A reference symbol 21 indicates a stator core.

In the manufacturing device 100 configured as described above, first, the material 1 is sequentially sent out from the coil 1A in the arrow F direction in FIG. 7. In addition, blanking is sequentially performed on this material 1 with the plurality of stages of the blanking stations 110. This blanking makes the shape of the electrical steel sheet 40 having the core back portion 22 and the plurality of tooth portions 23 shown in FIG. 3 obtained in the material 1. However, the material is not fully blanked at this point and thus moves toward the next step along the arrow F direction.

In addition, finally, the material 1 is sent out to the lamination station 140 and blanked with the outer circumferential blanking male mold 144, and the blanked products are laminated. Upon this lamination, the electrical steel sheet 40 receives a certain pressing force due to the spring 145. The blanking step and the lamination step, which have been described above, are sequentially repeated, whereby it is possible to stack a predetermined number of the electrical steel sheets 40. Furthermore, a laminate formed by stacking the electrical steel sheets 40 as described above is heated up to, for example, a temperature of 200° C. with the heating device 141. This heating makes the insulating coatings 3 of the electrical steel sheets 40 adjacent to each other adhere to each other (adhesion step).

The heating device 141 may not be disposed in the outer circumferential female mold 142. That is, the electrical steel sheets 40 laminated with the outer circumferential blanking female mold 142 may be removed to the outside of the outer circumferential blanking female mold 142 before caused to adhere together. In this case, the heat-insulating member 143 may not be present in the outer circumferential blanking female mold 142. Furthermore, in this case, the stacked electrical steel sheets 40 that are yet to adhere together may be transported or heated in a state of being held by being pinched from both sides in the lamination direction with jigs, not shown.

The stator core 21 is completed by the above-described individual steps.

The heating temperature in the adhesion step is, for example, preferably 120° C. to 250° C., more preferably 150° C. to 230° C. and still more preferably 200° C. to 220° C. When the heating temperature is the above-described lower limit value or higher, the insulating coatings 3 sufficiently cure, and the adhesion strength of the laminated core can be further increased. When the heating temperature is the above-described upper limit value or lower, it is possible to suppress the thermal deterioration of the insulating coating 3, and the adhesion strength of the laminated core can be further increased.

The heating time in the adhesion step is affected by the sizes of the laminated core or the heating method, but is, for example, preferably 30 to 120 minutes, more preferably 45 to 100 minutes and still more preferably 60 to 80 minutes. When the heating time is the above-described lower limit value or longer, the insulating coatings 3 sufficiently cure, and the adhesion strength of the laminated core can be further increased. When the heating time is the above-described upper limit value or shorter, it is possible to suppress the thermal deterioration of the insulating coating 3, and the adhesion strength of the laminated core can be further increased.

At the time of causing the insulating coatings 3 to adhere to each other, the insulating coatings 3 may be caused to adhere to each other by pressing the laminate.

The pressure at the time of pressing the laminate is, for example, preferably 2 to 50 MPa, more preferably 3 to 30 MPa and still more preferably 4 to 20 MPa. When the pressure at the time of pressing the laminate is the above-described lower limit value or higher, the insulating coatings 3 sufficiently adhere to each other, and the adhesion strength of the laminated core can be further increased. When the pressure at the time of pressing the laminate is the above-described upper limit value or lower, it is possible to suppress the protrusion of the insulating coating 3 from the end portion, and the lamination accuracy of the laminated core can be further improved.

The pressing time at the time of pressing the laminate is, for example, preferably 3 to 120 minutes, more preferably 10 to 100 minutes and still more preferably 30 to 80 minutes. When the pressing time is the above-described lower limit value or longer, the insulating coatings 3 sufficiently adhere to each other, and the adhesion strength of the laminated core can be further increased. When the pressing time is the above-described upper limit value or shorter, it is possible to suppress the protrusion of the insulating coating 3 from the end portion, and the lamination accuracy of the laminated core can be further improved.

Hitherto, one embodiment of the present invention has been described. However, the technical scope of the present invention is not limited only to the embodiment, and a variety of modifications can be added thereto within the scope of the gist of the present invention.

For example, the shape of the stator core 21 is not limited only to the form described in the embodiment. Specifically, the dimensions of the outer diameter and the inner diameter and the lamination thickness of the stator core 21, the number of the slots, the dimensional ratio of the tooth portion 23 between the circumferential direction and the radial direction, the dimensional ratio in the radial direction between the tooth portion 23 and the core back portion 22 and the like can be arbitrarily designed depending on desired characteristics of rotary electric machines.

In the rotor 30 in the embodiment, one set of two permanent magnets 32 forms one magnetic pole, but the present invention is not limited only to this form. For example, one permanent magnet 32 may form one magnetic pole or three or more permanent magnets 32 may form one magnetic pole.

In the embodiment, as the rotary electric machine 10, the permanent magnet field-type electric motor has been described as an example, but the structure of the rotary electric machine 10 is not limited only thereto as exemplified below, and, furthermore, it is also possible to employ a variety of well-known structures that are not provided as exemplary examples below.

In the embodiment, as the rotary electric machine 10, the permanent magnet field-type electric motor has been described as an example, but the present invention is not limited only thereto. For example, the rotary electric machine 10 may be a reluctance-type electric motor or a winding-field electric motor (winding-field electric motor).

In the embodiment, as the alternating-current electric motor, the synchronous electric motor has been described as an example, but the present invention is not limited thereto. For example, the rotary electric machine 10 may be an induction electric motor.

In the embodiment, as the rotary electric machine 10, the alternating-current electric motor has been described as an example, but the present invention is not limited thereto. For example, the rotary electric machine 10 may be a direct-current electric motor.

In the embodiment, as the rotary electric machine 10, the electric motor has been described as an example, but the present invention is not limited thereto. For example, the rotary electric machine 10 may be an electric generator.

Additionally, it is possible to appropriately replace any of the configurational elements in the embodiment with a well-known configurational element within the scope of the gist of the present invention, and the above-described modification examples may be appropriately combined with each other.

EXAMPLES

Hereinafter, the effect of one aspect of the present invention will be more specifically described using examples and comparative examples, but conditions in the examples are simply examples of the conditions adopted to confirm the feasibility and effect of the present invention, and the present invention is not limited to the following examples. The present invention is capable of employing a variety of conditions within the scope of the gist of the present invention as long as the objective of the present invention is achieved.

Examples 1 to 9 and Comparative Examples 1 to 11

0.25 mm-thick and 100 mm-wide non-oriented electrical steel sheets composed of, by mass %, Si: 3.0%, Mn: 0.2%, Al: 0.5% and a remainder of Fe and impurities were manufactured. As coating compositions for an electrical steel sheet, epoxy resin compositions shown in Table 1 were used.

The epoxy resin composition was applied under baking conditions shown in Table 1 such that the thicknesses of insulating coatings reached 3 μm on an average. Specifically, first, a 55 mm×55 mm-sized single sheet was cut out from the non-oriented electrical steel sheet, and this single sheet was blanked in a ring shape that was 300 mm in outer diameter and 240 mm in inner diameter. Next, a coating composition for an electrical steel sheet was applied to the surface of the single sheet, then, two single sheets were overlapped and pressed, thereby producing a laminate. As pressing conditions, the steel sheet temperature was set to 200° C., the pressure was set to 10 MPa, and the pressing time was set to 1 hour.

<Measurement of Magnetic Characteristic>

A magnetic characteristic was measured using the laminate in a single-sheet tester based on JIS C 2556: 2015. As the magnetic characteristic (magnetic property), "W10/400 (W/kg)" was evaluated as the iron loss. "W10/400" is an iron loss when the frequency is 400 Hz and the maximum magnetic flux density is 1.0 T. Regarding the evaluation criteria of the magnetic characteristic, in a case where W10/400 was set to 12.0 W/kg or less and W10/400 was 12.0 W/kg or less, the magnetic characteristic was evaluated as not deteriorating (marked as "Good" in Table 2).

<Measurement of Adhesion Strengths>

The shear adhesion strengths were measured by the following method. First, two 30 mm×60 mm-sized single sheets were cut out from the non-oriented electrical steel sheet. Next, the coating composition for an electrical steel sheet was applied to the surfaces, and the two single sheets on which the coating composition had been applied were overlapped so as to wrap as much as 30 mm×10 mm and pressed, thereby producing a measurement sample. As pressing conditions, the steel sheet temperature was set to 200° C., the pressure was set to 10 MPa, and the pressing time was set to one hour.

The obtained sample was stretched with a tensile tester in an atmosphere where the atmosphere temperature was 25° C. and in an atmosphere where the atmosphere temperature was 150° C., the maximum loads (N) applied until the two single sheets peeled off from each other were measured, and numerical values obtained by dividing this maximum load (N) by the adhering area were regarded as the adhesion strengths at the corresponding temperatures.

In Table 1, the types of individual components of the coating compositions for an electrical steel sheet are as described below.

<Epoxy Resins>
 E1: Bisphenol A-type epoxy resin
 E2: Bisphenol F-type epoxy resin
 E3: Triphenylmethane-type epoxy resin
<Phenolic Curing Agents (A) (Curing Agents A)>
 A1: Phenolic resol resin
 A2: Phenolic novolac resin
 A3: Cresol naphthol formaldehyde condensate
<Comparative Components of Curing Agent A>
 C1: Triethylenetetramine
 C2: Methylhexahydrophthalic anhydride
<Amine-Based Curing Agents (B) (Curing Agents B)>
 B1: Meta-xylylenediamine
 B2: Diaminodiphenylmethane
 B3: Dicyandiamide
<Different Epoxy Resin Curing Agents (D)>
 D1: Adipic acid dihydrazide
 D2: Amine adduct (melting point: 100° C., average number molecular weight: 1500)
<Arbitrary Components>
 Emulsifier: Nonionic surfactant (polyoxyethylene alkyl ether)
 Defoamer: Silicone-based defoamer (polydimethylsiloxane-based compound-type defoamer)
<Determination>

From the results of the measurement of the magnetic characteristic and the measurement of the adhesion strength, the iron loss and the heat resistance were evaluated based on the following evaluation standards. A small iron loss means that stress strain that is imparted to electrical steel sheets is suppressed. The measurement results and the evaluation determinations are shown in Table 2. In the table, values outside the scope of the invention were underlined.

<Evaluation Standards>

"Good": The adhesion strength at 150° C. is 0.5 MPa or higher and the iron loss is 12.0 W/kg or less.

"Bad": The adhesion strength at 150° C. is less than 0.5 MPa and the iron loss is more than 12.0 W/kg.

TABLE 1

| | Epoxy resin composition | | | | | | | | | | | |
|---|---|---|---|---|---|---|---|---|---|---|---|---|
| | Epoxy resin | | Curing agent A | | Curing agent B | | | Different epoxy resin curing agent | | Arbitrary component | | Baking conditions | |
| Sample No. | Type | Parts by mass | Kind | Parts by mass | Type | Parts by mass | A/B | Type | Parts by mass | Type | Parts by mass | Achieving temperature (° C.) | Time (seconds) |
| Example 1 | E1 | 100 | A1 | 19 | B1 | 1.0 | 19.0 | | | Emulsifier | 0.4 | 160 | 10 |
| Example 2 | E1 | | A1 | 8 | B2 | 2.5 | 3.2 | | | Emulsifier | 1.0 | 160 | 10 |
| Example 3 | E1 | | A1 | 30 | B3 | 4.0 | 7.5 | | | Emulsifier | 0.4 | 180 | 10 |
| Example 4 | E2 | | A2 | 16 | B2 | 4.0 | 4.0 | | | Emulsifier | 1.0 | 160 | 20 |
| Example 5 | E2 | | A2 | 38 | B2 | 2.0 | 19.0 | | | Defoamer | 0.1 | 200 | 10 |
| Example 6 | E3 | | A3 | 9.5 | B3 | 0.8 | 11.9 | | | Emulsifier | 1.0 | 140 | 20 |
| Example 7 | E3 | | A3 | 4.5 | B3 | 0.5 | 9.0 | | | Emulsifier | 1.0 | 140 | 30 |
| Example 8 | E3 | | A3 | 4 | B3 | 0.5 | 8.0 | D1 | 1.0 | Emulsifier | 1.0 | 140 | 30 |
| Example 9 | E1 | | A1 | 14 | B2 | 1.0 | 14.0 | D2 | 3.0 | Emulsifier | 0.4 | 140 | 10 |
| Comparative Example 1 | E1 | | A1 | <u>45</u> | B1 | 1.0 | 45.0 | | | Emulsifier | 2.0 | 180 | 20 |
| Comparative Example 2 | E1 | | A1 | <u>0.5</u> | B1 | 1.0 | 0.5 | | | Emulsifier | 2.0 | 160 | 10 |
| Comparative Example 3 | E1 | | A1 | 10 | B1 | <u>5.5</u> | 1.8 | | | Emulsifier | 0.4 | 160 | 10 |
| Comparative Example 4 | E3 | | A2 | 10 | B2 | <u>0.01</u> | 1000.0 | | | Emulsifier | 2.0 | 140 | 20 |
| Comparative Example 5 | E3 | | A2 | 18 | B3 | <u>0.3</u> | 60.0 | | | Emulsifier | 0.5 | 140 | 20 |
| Comparative Example 6 | E2 | | A3 | 25 | B3 | <u>7.0</u> | 3.6 | | | Defoamer | 0.1 | 200 | 10 |
| Comparative Example 7 | E2 | | <u>C1</u> | 10 | <u>—</u> | <u>—</u> | — | | | Defoamer | 0.1 | 200 | 10 |

TABLE 1-continued

Epoxy resin composition

| Sample No. | Epoxy resin Type | Epoxy resin Parts by mass | Curing agent A Kind | Curing agent A Parts by mass | Curing agent B Type | Curing agent B Parts by mass | A/B | Different epoxy resin curing agent Type | Different epoxy resin curing agent Parts by mass | Arbitrary component Type | Arbitrary component Parts by mass | Baking conditions Achieving temperature (° C.) | Baking conditions Time (seconds) |
|---|---|---|---|---|---|---|---|---|---|---|---|---|---|
| Comparative Example 8 | E2 | | C2 | 10 | — | — | — | | | Defoamer | 1.0 | 200 | 10 |
| Comparative Example 9 | E1 | | — | — | B1 | 4.0 | — | | | Emulsifier | 1.0 | 160 | 20 |
| Comparative Example 10 | E1 | | A1 | 16 | — | — | — | | | Emulsifier | 1.0 | 160 | 20 |
| Comparative Example 11 | E1 | | — | — | — | — | — | | | Emulsifier | 0.5 | 160 | 20 |

TABLE 2

| Sample No. | Adhesion strength (MPa) 25° C. | Adhesion strength (MPa) 150° C. | Magnetic property (W/kg) W10/400 | Determination |
|---|---|---|---|---|
| Example 1 | 15.0 | 3.0 | 10.8 | Good |
| Example 2 | 8.0 | 1.0 | 11.3 | Good |
| Example 3 | 12.0 | 2.0 | 11.2 | Good |
| Example 4 | 7.0 | 1.0 | 11.4 | Good |
| Example 5 | 11.0 | 2.0 | 11.9 | Good |
| Example 6 | 6.0 | 1.0 | 12.0 | Good |
| Example 7 | 6.0 | 1.0 | 11.6 | Good |
| Example 8 | 5.5 | 1.5 | 11.3 | Good |
| Example 9 | 10.0 | 1.5 | 11.5 | Good |
| Comparative Example 1 | 14.0 | 1.0 | 13.3 | Bad |
| Comparative Example 2 | 9.0 | 0.4 | 12.3 | Bad |
| Comparative Example 3 | 13.0 | 0.9 | 12.4 | Bad |
| Comparative Example 4 | 8.0 | 0.5 | 13.6 | Bad |
| Comparative Example 5 | 6.0 | 3.0 | 13.7 | Bad |
| Comparative Example 6 | 12.0 | 0.4 | 12.4 | Bad |
| Comparative Example 7 | 14.0 | 1.0 | 13.6 | Bad |
| Comparative Example 8 | 10.0 | 0.6 | 13.8 | Bad |
| Comparative Example 9 | 8.0 | 0.2 | 11.3 | Bad |
| Comparative Example 10 | 12.0 | 0.8 | 12.2 | Bad |
| Comparative Example 11 | 3.0 | 0.2 | 11.7 | Bad |

As shown in Table 2, in Examples 1 to 9 to which the present invention was applied, the adhesion strengths at 150° C. were 0.5 MPa or higher, the iron losses were 12.0 W/kg or less, and the determinations were "Good".

On the other hand, in Comparative Examples 1 and 2 where the amount of the phenolic curing agent (A) was outside the scope of the present invention, the iron losses were more than 12.0 W/kg, and the determinations were "Bad". In Comparative Examples 3 to 6 where the amount of the amine-based curing agent (B) was outside the scope of the present invention, the iron losses were more than 12.0 W/kg, and the determinations were "Bad". In Comparative Examples 7 and 8 where an aliphatic polyamine or an acid anhydride-based curing agent was used instead of the phenolic curing agent (A), the iron losses were more than 12.0 W/kg, and the determinations were "Bad". In Comparative Examples 9 and 11 where the phenolic curing agent (A) was not contained, the adhesion strengths at 150° C. were lower than 0.5 MPa, and the determinations were "Bad". In Comparative Example 10 where the amine-based curing agent (B) was not contained, the iron loss was more than 12.0 W/kg, and the determination was "Bad".

From the above-described results, it was found that, according to the coating composition for an electrical steel sheet of the present invention, stress strain that is imparted to electrical steel sheets is suppressed, and the heat resistance is high enough to maintain the adhesion strength even during the generation of heat from motors.

BRIEF DESCRIPTION OF THE REFERENCE SYMBOLS

10 Rotary electric machine
20 Stator
21 Adhesive laminated core for stator
30 Rotor
40 Electrical steel sheet
50 Case
60 Rotary shaft

What is claimed is:

1. A coating composition for an electrical steel sheet comprising:
    an epoxy resin;
    a phenolic curing agent (A); and
    amine-based curing agents (B) which is an aromatic amine,
    wherein an amount of the phenolic curing agent (A) is 1 to 40 parts by mass with respect to 100 parts by mass of the epoxy resin, and an amount of the amine-based curing agents (B) is 0.5 to 5 parts by mass with respect to 100 parts by mass of the epoxy resin.

2. The coating composition for an electrical steel sheet according to claim 1,
    wherein a mass ratio represented by [the amount of the phenolic curing agent (A)]/[the amount of the amine-based curing agents (B)] is 1 to 20.

3. An adhesive surface-coated electrical steel sheet comprising:
    an insulating coating containing the coating composition for an electrical steel sheet according to claim 1 on a surface,
    wherein a thickness is 0.65 mm or less.

4. An adhesive surface-coated electrical steel sheet comprising:
   an insulating coating containing the coating composition for an electrical steel sheet according to claim 2 on a surface,
   wherein a thickness is 0.65 mm or less.

5. A laminated core formed by laminating two or more adhesive surface-coated electrical steel sheets according to claim 3.

6. A laminated core formed by laminating two or more adhesive surface-coated electrical steel sheets according to claim 4.

\* \* \* \* \*